Figure 1:
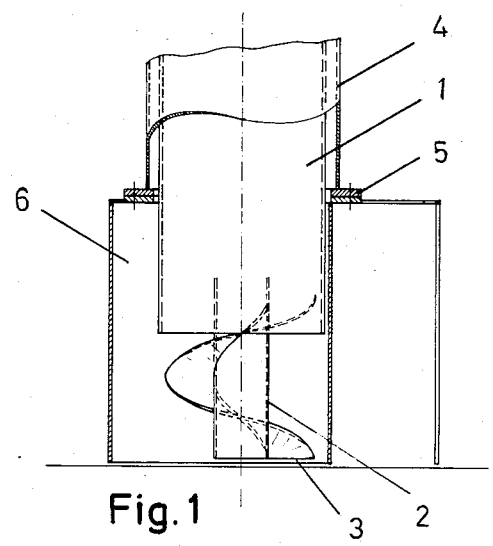

United States Patent [19]

Svens

[11] Patent Number: 4,492,302

[45] Date of Patent: Jan. 8, 1985

[54] FEEDING DEVICE FOR A VERTICAL TUBE CONVEYOR

[75] Inventor: Runar Svens, Enköping, Sweden

[73] Assignee: AB Nordströms Linbanor, Enköping, Sweden

[21] Appl. No.: 341,210

[22] Filed: Jan. 21, 1982

[30] Foreign Application Priority Data

Jan. 26, 1981 [SE] Sweden .................. 8100455

[51] Int. Cl.³ .............................. B65G 33/00
[52] U.S. Cl. ................... 198/671; 198/508
[58] Field of Search .......... 198/518, 671, 608

[56] References Cited

U.S. PATENT DOCUMENTS 3,596,751 8/1971 Siwersson et al. .......... 198/608
3,685,638 8/1972 Siwersson et al. .......... 198/671

FOREIGN PATENT DOCUMENTS 322161 3/1970 Sweden .
343818 3/1972 Sweden .
7903084 4/1979 Sweden .

Primary Examiner—Joseph E. Valenza
Assistant Examiner—Jonathan D. Holmes
Attorney, Agent, or Firm—Fisher, Christen & Sabol

[57] ABSTRACT

A feeding device for a vertical tube conveyor supplying the goods towards the lower input end of the conveyor consists of at least one vertical feeding wing rotatable around the lower end of the conveyor, the wing having a vertical elongation from the lower end of the casing of the conveyor to or beyond the lowest end of the conveyor, said wing forming a helix curve running from one point close to the casing, the angle between the tangent of the curve and the direction of rotation along the major part of the curve being such that the tangential force from the wing does not counteract the feeding of the goods into the supplier.

1 Claim, 2 Drawing Figures

FEEDING DEVICE FOR A VERTICAL TUBE CONVEYOR

BACKGROUND OF THE INVENTION

The present invention refers to a feeding device for a vertical tube conveyor for supplying the goods towards the lower input end of the conveyor.

PRIOR ART

In order to obtain a high degree of filling in the vertical tube conveyor usually a screw conveyor or a pneumatic conveyor for conveying powder material, such as coal or concrete, the conveyor at its lower end has to be provided with some type of feeding device for the goods. Thus, a screw transporter at its input end by the screw gives rise to powers which has a tendency to repel the material from the input whereas in a pneumatic conveyor the very limited surface is covered which means that especially when very little goods remains to be conveyed, one will have difficulties in obtaining a high degree of filling in the conveyor.

A number of feeding devices for vertical screw conveyors are also known per se. Thus, the Swedish Pat. Nos. 322,161 and 343,818 show such feeding devices which are provided with screw shaped wings which give the material to be conveyed an axial downward movement towards the input end of the conveyor. The feeding devices therein described do however have two essential drawbacks. Thus, the feeding capacity will be low when the material is compressed or clamped and furthermore, the device will leave a relatively thick layer of goods at the bottom of the goods container. This material has to be conveyed by other means, usually with high efforts of man power which means that a major part of the time gain obtained from the screw conveyor is lost.

Another feeding device for the above purposes is shown in the Swedish patent application No. 7903084-7, which describes a feeding device with a number of vertical somewhat tapered wings. This device permits that in principal also goods at the bottom of the goods container can be brought into the conveyor. The disadvantage of the device is however that the material because of the shape of the wings is subject to a tangential force when the feeding device rotates which means that the material will rotate together with the device whereby the centrifugal force which will then affect the material counteracts the desired purpose, namely to obtain a radial pressure of the material towards the centre of the conveyor. The material will thus have a tendency to remain in the area between the wings and rotate together with the device.

BROAD DESCRIPTION OF THE INVENTION

It is an object of the present invention to provide a feeding device of the type described above, the device according to the invention permitting a feeding of goods also from the bottom of the goods container and not having the disadvantage that the material clamp in the device but permits an even flow of material towards the inlet end of the conveyor.

The invention involves a feeding device for a vertical tube conveyor which supplies the goods into the lower input end of the conveyor. There is at least one vertical feeding wing which is rotatable around the lower end of the conveyor. The wing has a vertical elongation extending from the lower end of the casing of the conveyor to or beyond the lowest end of the conveyor. The wing forms a helical curve starting from a point close to the casing. The angle between the tangent of the curve and the direction of rotation along the major part of the curve is such that the tangential force from the wing does not counteract the feeding of the goods into the supplier.

Figure 2:
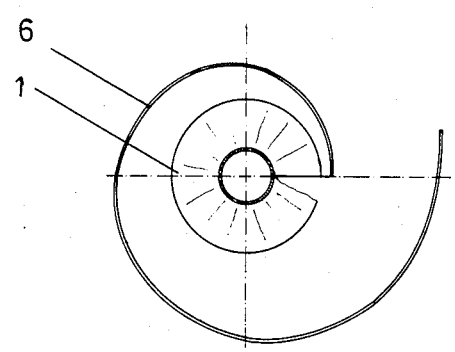

The invention will now be described in detail, reference being made to the attached drawing in which:

FIG. 1 is a side view of a device according to the invention used on a screw conveyor; and FIG. 2 shows the device according to FIG. 1 seen from below.

In the drawing reference 1 denotes the lower part of a screw conveyor containing a screw 3 arranged on a journalled axis 2. The conveyor is provided with an outer casing 4 which from a driving means now shown in the drawing can be brought to rotate opposite to the direction of rotation of the screw 3. The outer casing carries via a flange 5 a feeding device according to the invention consisting of a helix shaped wing 6. In the embodiment shown in FIG. 2 the wing 6 is designed so as to have a tangent which has a substantially constant angle with respect to the direction of rotation. The wing could also be designed so as to have a tangent positioned in the tangential direction of the rotation at the outer end of the wing which means that the material brought inside the wing will at that location not be subject to any tangential force. Along its further extension towards the conveyor the wing could then have a successively increasing tangential angle with respect to the direction of rotation. This design proves to imply that the tendency of the material to clamp in the supplier as has been described above could be eliminated if a suitable rotational speed is used. It has also proved advantageous to locate the inner end of the wing at a certain small distance from the casing of the conveyor.

This will namely imply that a ring of material is formed close to the casing. As compared to the supplying device described in the above defined Swedish patent application the device according to the invention also has the advantage that it has an open upper end which means that goods from layers above the supplier will fall down into the supplier.

In the embodiment according to the drawings the invention has been described applied on a screw conveyor but it could of course also be used for other types of tube conveyors such as pneumatic conveyors. Furthermore, the number of supplying wings could be more than one. Thus two or several wings could be used provided that the design of the wings is such that the tangential angle is remained so small that the tangential force on the goods remains small.

We claim:

1. Screw conveyor for raising powder or particulate material, comprising a cylindrical casing with a lower inlet end, a conveyor screw rotatably mounted in said casing and a feeder device for moving material toward the inlet end of said casing, said feeder device being rotatable relative to said screw and comprising at least one feeder shovel disposed about the inlet end of said casing and extending in its entirety parallel to said casing from a plane above the lower end of said casing at least down to the lowest point of said conveyor, characterized in that said shovel forms a spiral drum which surrounds the inlet end of said casing, that said shovel has a top portion and a bottom portion, each of which defines a plane which is perpendicular to the axis of rotation of said conveyor screw, that said shovel describes, in a plane perpendicular to the longitudinal axis of said casing, a spiral curve which has a starting edge and a trailing edge and which starts from a point a short distance from said casing, the angle formed between the tangent to said spiral curve and the rotational, directional component being constant at every point along said spiral curve, that said angle is so small that said shovel moves the material inward with a force which is greater than the outwardly-directed force on the material exerted by said screw, and that said starting edge and said trailing edge of said spiral curve of said shovel extending between and being perpendicular to said planes formed by said top portion and said bottom portion of said shovel.

* * * * *